United States Patent [19]  [11] 4,197,339
Paul et al.  [45] Apr. 8, 1980

[54] LOW PRESSURE PROCESS FOR PRODUCING SUBSTANTIALLY VOIDLESS COMPOSITES

[75] Inventors: Roy D. Paul, Windsor; Henry C. Winiarski, Hartford, both of Conn.

[73] Assignee: United Technologies Corporation, Hartford, Conn.

[21] Appl. No.: 864,941

[22] Filed: Dec. 27, 1977

[51] Int. Cl.² ............................................. B05D 3/12
[52] U.S. Cl. .............................. 427/370; 427/374.6; 528/322; 528/344; 528/353
[58] Field of Search ............... 427/370, 296, 371, 294, 427/374 E, 331; 260/65; 528/67, 176, 322, 344, 353, 229

[56] References Cited

U.S. PATENT DOCUMENTS

| | | | |
|---|---|---|---|
| 3,575,923 | 4/1971 | Jones | 260/65 |
| 3,654,227 | 4/1972 | Dine-Hart | 260/65 |
| 3,708,458 | 1/1973 | Alberino et al. | 260/65 |
| 3,745,149 | 7/1973 | Serafini et al. | 260/65 |
| 3,930,091 | 12/1975 | Alberino et al. | 427/370 |

OTHER PUBLICATIONS

Gibbs, "Low Void Composites Based on NR-150 Polyimide Binders," 1973, The Society of the Plastics Industry, Inc., Section 2-D, pp. 1-12.
Vaughan et al., "Filament Winding S-Glass–Polyimide Resin Composite Processing Studies," Feb. 1974, pp. V, 27 and 28.
Cavano, Resin/Graphite Fiber Composites, NASA CR-121275, Mar. 15, 1974, pp. V, VI and 28.
O'Rell et al., "Development of Autoclavable Polyimides," Nov. 21, 1974, pp. V and VI. Z

*Primary Examiner*—Michael F. Esposito
*Assistant Examiner*—Sadie L. Childs
*Attorney, Agent, or Firm*—John D. Del Ponti

[57] ABSTRACT

Filament-reinforced A-type PMR polyimide composites are prepared by mixing known monomers, applying the mixture as a matrix material to a plurality of the filaments, imidizing to obtain a prepolymer having a defined melt temperature range, heating the prepolymer to an addition polymerization temperature to effect cure, applying a pressure of 50-300 psi before reaching cure temperature and while in the melt temperature range, and maintaining said pressure while curing.

9 Claims, No Drawings

LOW PRESSURE PROCESS FOR PRODUCING SUBSTANTIALLY VOIDLESS COMPOSITES

BACKGROUND OF THE INVENTION

The present invention relates to an improved molding method and more particularly to a low pressure technique for molding a substantially voidless filament-reinforced resin matrix composite.

While it is known to fabricate filament-reinforced composites utilizing polyimide resin as a matrix material, there has been a continuing effort to define a matrix system which provides the best overall balance of processability, and while providing a sustantially voidless (below 10%) product having excellent mechanical properties in air at 600° F.

SUMMARY OF THE INVENTION

It is an object of the present invention to define a process for molding substantially voidless filament-reinforced A-type PMR polyimide resin composites at pressures much below those currently employed.

In accordance with the present invention, a low pressure method for fabricating substantially voidless filament-reinforced composites comprises the steps of (a) mixing a plurality of compounds of the formulae:

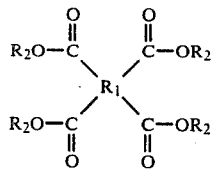

(1)

wherein
  $R_1$ is a tetravalent aryl radical;
  $R_2$ is alkyl or hydrogen and at least two $R_2$ are alkyl;

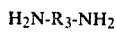

(2)

wherein $R_3$ is a divalent aryl radical; and

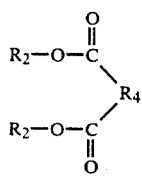

(3)

wherein $R_2$ is alkyl or hydrogen and at least one $R_2$ is alkyl and $R_4$ is a divalent radical of the formula:

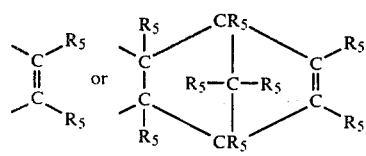

wherein
  $R_5$ is hydrogen or lower alkyl; and
  wherein the molar ratio of (1):(2):(3) is

$N:(N+1):2$, wherein N has a value of 1 to 20;

(b) applying the mixture as a matrix material to a plurality of filaments;
(c) imidizing to obtain a prepolymer having a defined melt temperature range;
(d) heating the prepolymer to an addition polymerization temperature to effect cure;
(e) before reaching said temperature, and while in its melt temperature range, applying a pressure of 50–300 psi; and
(f) maintaining said pressure during cure.

In accordance with one aspect of the present invention, the process is carried out in an autoclave and the preferred pressure is 100–200 psi. Provision is made for providing a vacuum pressure to assist in solvent removal.

DESCRIPTION OF THE PREFERRED EMBODIMENT

A-type PMR polyimides are a class of polyimides whereby mixtures of monomeric reactants in a solvent solution are polymerized in situ. Illustrative monomeric reactants are diamines and esters of polycarboxylic acids described in U.S. Pat. No. 3,745,149, the teachings of which are hereby incorporated by reference. In general, monomer compounds of the following formulas are mixed:

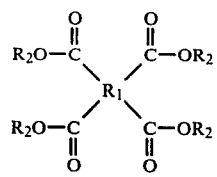

(1)

wherein $R_1$ is a tetravalent aryl radical and $R_2$ is alkyl or hydrogen and at least two $R_2$ are alkyl;

$H_2N-R_3-NH_2$ (2)

wherein $R_3$ is a divalent aryl radical; and

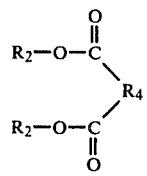

(3)

wherein $R_2$ is alkyl or hydrogen and at least one $R_2$ is alkyl and $R_4$ is a divalent radical of the formula:

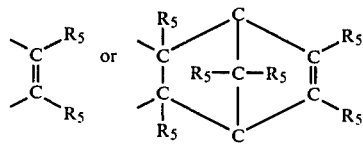

wherein
  $R_5$ is hydrogen or lower alkyl; and
  wherein the molar ratio of (1):(2):(3) is $N:(N+1):2$ wherein N has a value of 1 to 20, preferably 1 to about 5.

Various solvents for the selected monomers may be used—methanol, butanol, ethanol and the like all being satisfactory.

A preferred PMR monomer mixture comprises a methyl alcohol solution of monomers monoethyl ester of 5-norbornene-2, 3-dicarboxylic acid (NE), dimethyl ester of 3,3', 4,4'-benzophenonetetracarboxylic acid (BTDE) and 4,4'-methylenedianiline (MDA). Another preferred PMR monomer mixture comprises an ethyl alcohol solution of monomers NE, dimethyl ester of 4,4'-(hexafluoroisopropylidene)-bis(phthalic acid) (HFDE) and p-phenylenediamine (PPDA).

The acronym "PMR" stands for polymerization of monomeric reactants while the term "A-type" refers to the addition type polymerization reaction occurring at temperatures from about 275° C. (527° F.) to 350° C. (662° F.).

Although production of void-free A-type PMR polymide resin/fiber composites by molding are known, current processing requires high molding pressures—in the range of 500–1000 psi. As will be appreciated, particularly when dealing with high modulus, high strength, relatively brittle filaments (e.g. boron, silicon carbide, silicon carbide coated boron or graphite), these higher pressures may result in fiber degradation. In addition, the need for higher pressures may unduly limit the size of the composite to be manufactured to the capacity of the pressing apparatus.

It has been discovered, on the basis of close monitoring of the curing of the foregoing polymeric resin systems and, in particular, on the basis of observed changes in dissipation factor and capacitance in the temperature range of 400° to 600° F., that A-type PMR polyimide resins may be molded at pressures and temperatures considerably lower than 500 psi and 600° F., respectively. In fact, it is possible to produce substantially voidless (less than 10% voids) resin/fiber composites at pressures as low as 50–300 psi, preferably 100–200 psi, while curing at temperatures in the range of about 527° to 650° F. The inventive process applies to the low pressure molding of composite structures by the judicious application of heat and pressure, preferably by auto clave molding and most preferably by vacuum autoclave molding. In vacuum autoclave molding, vacuum pressure is used to assist removal of solvent and reaction products. Those skilled in the art will appreciate that the inventive process is most suitable for making large, relatively thin panels as well as for producing very complex shapes, as opposed to state-of-the-art high compression molding techniques which provide better and more economical hardware in thick structures and in relatively simple configurations.

A key part of the inventive process centers on achieving full conversion of the monomeric reactants to the prepolymer by condensation polymerization. Otherwise, the resulting composite will be voidy and susceptible to blistering during post cure at temperatures above the molding temperature. In addition, great importance is attached to the pinpointing of the prepolymer melt temperature range (which extends between the prepolymer melt temperature and the cure initiation temperature) and the application of molding pressures therein and the maintenance thereof throughout cure.

In general, with respect to vacuum autoclave processing the inventive technique is exemplified by the following sequence of steps:

A. Initiate prepolymer formation by condensation imidization of the applied monomer mixture under a partial vacuum pressure (below 10 in. Hg.) and at a temperature in the range of approximately 250°–400° F.;

B. Complete prepolymer formation, preferably by holding at 400° F. Time at this temperature is dependent upon laminate thickness and heat-up rate and is not critical. Times as short as five minutes and as long as three hours have been used successfully;

C. Heat the laminate, preferably relatively slowly (e.g., 2°–4° F./min.) to the melting temperature of the prepolymer (425±5° F. for PMR-15);

D. Apply full vacuum pressure (24–30 in Hg.) after the prepolymer melt temperature is reached;

E. Heat at a moderate rate (e.g., 4°–10° F./min.) to a cure temperature (at least about 527° F.);

F. Apply molding pressure (50–300 psi) within the prepolymer melting temperature range, preferably at approximately the midpoint thereof and maintain throughout cure;

G. Hold at cure temperature, typically for at least one hour;

H. Cool and remove; and

I. Post cure, preferably at 600° F.

With respect to low pressure compression molding the cycle is identical to the foregoing except that vacuum pressure is not required.

The present invention finds particular utility in the production of structural composites such as lightweight structural composites as, for example, fan or compressor blades. Choice of filament as a reinforcement for the resin herein described is not critical and is dependent on the particular environment in which the composite will be used and may comprise, for example, filaments of boron, silicon carbide, silicon-carbide coated boron, carbon or graphite, glass, etc.

In order that those skilled in the art will better understand the inventive process, the following specific examples are provided.

EXAMPLE 1

A PMR-15 resin binder solution, comprising a methyl alcohol solution of the monomers monoethyl ester of 5-norbornene-2, 3-dicarboxylic acid (NE), dimethyl ester of 3,3', 4,4'-benzophenonetetracarboxylic acid (BTDE) and 4.4'-methylenedianiline (MDA), has its monomer components NE:MDA:BTDE in a molar ratio of 2:(N+1):N with N equal to 2.089 (such that the imidized prepolymer has a molecular weight of 1500).

Commercially available 7781 style E-glass cloth with an A-1100 type finish is impregnated with PMR-15 by dipping. The resulting prepreg plies are commercially available, e.g. as CPI 2237/7781 from Ferro Corporation.

In a series of tests, fourteen of the PMR-15/glass cloth prepreg plies (in sizes up to 18"×18") were stacked in alternate layers of 0°/90° orientation on a caul plate, encapsulated in a vacuum bag and inserted into a simulated autoclave. The bag was evacuated to a vacuum pressure of 2–4 inches of mercury and the temperature raised to 250° F. at a rate of 2°–4° F./min. and held for 20 minutes. The temperature was increased to 400° F. at a rate of 2°–4 ° F./min. and held there for one hour in order to achieve a fully imidized prepolymer having a melt temperature of 425±5° F. The vacuum pressure was then increased to 24–30 inches of mercury and the temperature increased at a rate of 4°–8° F./min. to a cure temperature of 550° F. An autoclave pressure of 100 psi was applied at a temperature of 467° F. The assembly was held at cure temperature for one and one-half hours, then cooled to 300° F. while maintaining full vacuum and autoclave pressures. The assembly was removed from the autoclave and post cured in air at 600° F. for 12 hours.

The resulting composites were substantially voidless (6-7 vol. % voids) and had an average Ultimate Tensile Strength of 57,356 psi at room temperature and 46,417 psi at 550° F., an average Tensile Modulus of $4.22 \times 10^{-6}$ psi at room temperature and $3.86 \times 10^{-6}$ psi at 550° F. and an average Short Beam Shear strength of 6,500 psi at room temperature and 3,563 psi at 550° F.

EXAMPLE 2

The procedure of Example 1 was repeated, except that vacuum application and temperature profile were different. The heat-up was as follows: at a rate of 4°-6° F./min. to 250° F. with a 30 minute hold at 225° F. and at 250° F., then at a rate of 5°-10° F./min. to 550° F. with a one hour hold at 400° F. and 550° F. A partial vacuum of 2-3 in.Hg. was applied at 180° F. and full vacuum at 550° F. The autoclave pressure was applied at 480° F.

The resulting composite was blisterless and had a void content of 9 vol. %. Short beam shear strength (at ±45°) was 6,157 psi.

EXAMPLE 3

The procedure of Example 1 is repeated with commercially available 5915 style S-glass cloth. The resulting composite had a void content of 5-7 vol. %.

EXAMPLE 4

Example 1 was repeated in an autoclave with butanol as the solvent instead of methanol and with the following schedule: Heat-up was to 600° F. at a rate of 5°-10° F./min. with a one hour hold at 600° F. A partial vacuum of 5-10 in.Hg. was applied at room temperature with full vacuum applied at 490° F. An autoclave pressure of 200 psi was also applied at 490° F. The resulting composite had no blisters and had a void content of 0.2 vol. %. Short beam shear strength was 11,084 psi.

EXAMPLE 5

Example 1 was repeated in an autoclave with the following schedule: Heat-up was to 600° F. at a rate of 5°-7° F./min. with a 30 minute hold at 225° F., a 30 minute hold at 250° F. and a one hour hold at 600° F. A partial vacuum of 2-3 in.Hg. was applied at room temperature and increased to 10 in.Hg. after the 250° F. hold. Full vacuum was applied at 490° F. An autoclave pressure of 200 psi was also applied at 490° F.

The resulting composite had no blisters, no measurable void content and a short beam shear strength of 8,924 psi.

EXAMPLE 6

Example 5 was repeated except that butanol was the solvent. The resulting composite had no blisters, exhibited a void content of 0.1 vol. % and had a short beam shear strength of 9,220 psi.

EXAMPLE 7

Example 6 was repeated except that autoclave pressure was 100 psi. The resulting composite was blisterless, had a void content of 2.5 vol. % and a short beam shear strength of 7,686 psi.

EXAMPLE 8

Example 1 was repeated in an autoclave using a mold and male mandrel to produce a blade shell. Heat-up was to 600° F. at 1°-1.5° F./min. with a one hour hold at 600° F. Full vacuum was applied at 325° F. and an autoclave pressure was initiated at 425° F. and gradually built up to 200 psi at 460° F.

The resulting composite blade shell had a void content of less than 2 vol. %.

EXAMPLE 9

Example 1 was repeated in an autoclave, but with orientation of alternate prepreg layers at ±45°. The heat-up was to 600° F. at a rate of 1°-1.5° F./min. with a one and one-half hour hold at 600° F. A partial vacuum of 2-3 in.Hg. was applied at room temperature, 10 in.Hg. at 225° F. and full vacuum at 325° F. Autoclave pressure was initiated at 425° F. and gradually built up to 200 psi at 460° F.

The resulting composite was blisterless and had a void content of 1 vol. %. Short beam shear at ±45° was 6,091 psi, UTS at ±45° was 32,472 psi and tensile modulus was $2.37 \times 10^6$ psi.

EXAMPLE 10

Example 9 is repeated using a compression mold and without vacuum pressure to produce a blisterless, substantially voidless composite having excellent mechanical properties.

EXAMPLE 11

The procedure of Example 9 is followed using a resin binder solution comprising an ethyl alcohol solution of the monomers NE, PPDA and HFDE in a molar ratio of 2:(N+1):N with N equal to 1.67 to produce a blisterless, substantially voidless composite having excellent mechanical properties.

EXAMPLE 12

The procedure of Example 4 is followed except the solvent is methanol, N is 1.26 and autoclave pressure is 50 psi. A blisterless substantially voidless composite with excellent mechanical properties will be produced.

EXAMPLE 13

The procedure of Example 5 is followed except that N is 5.186 and autoclave pressure is 300 psi. A blisterless, substantially voidless composite with excellent mechanical properties will be produced.

What has been set forth above is intended primarily as exemplary to enable those skilled in the art in the practice of the invention and it should therefore be understood that within the scope of the appended claims, the invention may be practiced in other ways than as specifically described.

What is claimed is:

1. A low pressure method of fabricating substantially voidless filament-reinforced composites comprising the steps of (a) mixing a plurality of monomeric compounds of the formulas:

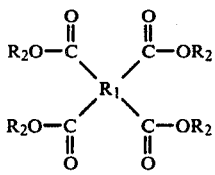

(1)

wherein

R₁ is a tetravalent aryl radical;

R₂ is alkyl or hydrogen and at least two R₂ are alkyl;

  (2)

wherein R₃ is a divalent aryl radical; and

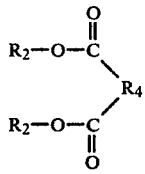  (3)

wherein R₂ is alkyl or hydrogen and at least one R₂ is alkyl and R₄ is a divalent radical of the formula:

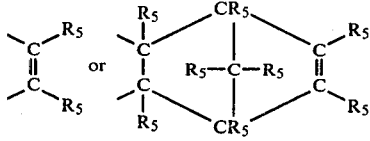

wherein R₅ is hydrogen or lower alkyl; and wherein the molar ratio of (1):(2):(3) is N:(N+1):2, wherein N has a value of 1 to 20;

(b) applying said mixture as a matrix material to a plurality of filaments;

(c) imidizing to fully convert said monomeric compounds to obtain, by condensation polymerization, a prepolymer having a defined melt temperature range;

(d) heating said prepolymer to an addition polymerization temperature to effect cure;

(e) before reaching said temperature and while in said melt temperature range, applying a pressure of 50–300 psi; and (f) maintaining said pressure during cure.

2. The method of claim 1 wherein said pressure is 100–200 psi.

3. The method of claim 1 wherein said steps (c)–(f) are performed in an autoclave.

4. The method of claim 3 wherein vacuum pressure is applied in said melt temperature range.

5. The method of claim 4 wherein said vacuum pressure is approximately 24–30 in.Hg.

6. The method of claim 1 wherein said addition polymerization temperature is in the range of approximately 527°–650° F.

7. The method of claim 6 wherein steps (c)–(f) are performed in an autoclave.

8. The method of claim 7 wherein vacuum pressure is applied in said melt temperature range.

9. The method of claim 8 wherein said vacuum pressure is approximately 24–30 in.Hg.

* * * * *